United States Patent [19]

Chao et al.

[11] 4,405,732

[45] Sep. 20, 1983

[54] FLAME RETARDANT POLYAMIDE COMPOSITIONS

[75] Inventors: Li-Chung Chao, Grand Island; Daniel J. Scharf, East Amherst, both of N.Y.

[73] Assignee: Occidental Chemical Corporation, Niagara Falls, N.Y.

[21] Appl. No.: 358,087

[22] Filed: Mar. 15, 1982

Related U.S. Application Data

[63] Continuation of Ser. No. 126,617, Mar. 3, 1980, abandoned.

[51] Int. Cl.³ .................................................. C08K 5/47
[52] U.S. Cl. ......................................................... 524/83
[58] Field of Search ............................................ 524/83

[56] References Cited

U.S. PATENT DOCUMENTS

3,888,822  6/1975  Gilleo et al. ................. 260/45.8 SN
3,951,908  4/1976  Kaiser et al. ................. 260/45.7 PE

OTHER PUBLICATIONS

M. R. Gajendragad et al, "1,3,4-Thiadiazole-2,5-dithiol as a Complexing Agent: Part III–Complexes of Cu(I), Zn(II), Ag(I), Cd(II), Tl(I), Pb(II), Pd(o) & Pt(o)", Indian Journal of Chemistry, vol. 13, (Jul. 1975), pp. 697–701.

*Primary Examiner*—V. P. Hoke
*Attorney, Agent, or Firm*—James F. Tao; Arthur S. Cookfair

[57] ABSTRACT

Nylon polymer compositions are rendered flame retardant by incorporating therein an effective flame retardant amount of a salt of 2,5-dimercapto-1,3,4-thiadiazole and a metal from the group consisting of Zn, Mn, Ba, Ni, Co, Fe, Cu, Mo, and Cr.

10 Claims, No Drawings

FLAME RETARDANT POLYAMIDE COMPOSITIONS

This is a continuation, of application Ser. No. 126,617 filed Mar. 3, 1980 now abandoned.

BACKGROUND OF THE INVENTION

This invention relates to nylon polymer systems having improved flame retardant properties.

In recent years concern for the fire hazards presented by many polymeric materials has led to the development of a variety of flame retardant or fire retardant additive compositions designed for incorporation in such polymeric materials. Thus, for example, it is known to impart flame retardant properties to polymeric materials by incorporation therein of various halogen containing additives, particularly chlorinated organic compounds. Although such additives have been found to effectively enhance the flame retardant properties of polymeric systems, many have been found to present environmental problems, particularly with respect to the release of toxic gases during combustion. Furthermore, the presence of halogen in the polymers has been found to present problems with respect to corrosion of equipment during processing of the polymer. In addition, a number of the prior art flame retardant additives are relatively low thermal stability, and exhibit a tendency to degrade during processing such as molding, at elevated temperatures.

It is an object of the present invention to provide improved flame retardant additive compositions for use in polymeric systems. It is a further object to provide flame retardant additive compositions having a relatively high thermal stability and resistance to degradation and decomposition under processing conditions at elevated temperatures. It is a still further object to provide flame retardant polymeric compositions exhibiting a substantially decreased tendency toward corrosion of processing equipment during processing. It is a still further object to provide such polymeric compositions characterized by the formation of char during combustion and the minimization of the release of toxic gases.

SUMMARY OF THE INVENTION

This invention provides novel nylon polymer compositions rendered flame retardant by the incorporation therein of an effective flame retardant amount of a salt of 2,5-dimercapto-1,3,4-thiadiazole and a metal from the group consisting of Zn, Mn, Ba, Ni, Co, Fe, Cu, Mo, and Cr. It has been found that nylon polymer compositions, incorporating the aforementioned salt of 2,5-dimercapto-1,3,4-thiadiazole are characterized by excellent thermal properties good processability, high char formation during combustion, and a minimal tendency toward the release of toxic gases during combustion.

The salts of 2,5-dimercapto-1,3,4-thiadiazole employed in accordance with the present invention are conveniently prepared by reacting a suitable salt of the desired metal with a potassium or sodium salt of 2,5-dimercapto-1,3,4-thiadiazole in aqueous solution. Thus, for example for the preparation of the desired zinc salt, $ZnCl_2$ is added to an aqueous solution of the potassium salt of 2,5-dimercapto-1,3,4-thiadiazole. The desired zinc salt of 2,5-dimercapto-1,3,5-thiadiazole is precipitated from the solution and readily recovered as a solid therefrom. It has been found that the replacement of a monovalent cation, such as sodium or potassium, by a divalent cation such as zinc or manganese or a trivalent cation such as chromium will result in the formation of a salt characterized by the empirical formula

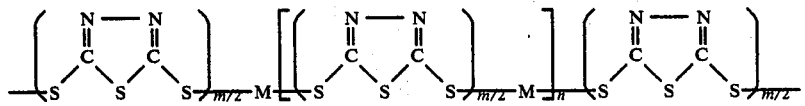

wherein
M is a divalent or trivalent metal ion from the group consisting of Zn, Mn, Ba, Ni, Co, Fe, Cu, Mo and Cr;
n is 0 to 16;
m is 2 or 3 and is equal to the valence of M.

Typically the end groups are linked to a monovalent cation such as a potassium or sodium ion or two or three end groups may be linked through a divalent or trivalent metal ion to form a cyclic structure. For convenience, the compounds characterized by the foregoing structure, either individually or as a mixture thereof, are referred to herein as the metal salts of 2,5-dimercapto-1,3,4-thiadiazole (DMTDA).

The polyamides which may be employed in the flame retardant compositions of this invention are those polymers, commonly known by the generic term, nylon, characterized by the presence of recurring amide groups as an integral part of the polymer chain. Included are the various nylon homopolymers, copolymers, and the like as well as blends thereof. Typical of the nylon compositions are polycaprolactam (nylon 6); the polyamides derived by condensation of dicarboxylic acid with a diamine, such as polyhexamethylene adipamide (nylon 66), polyhexamethylene sebacamide (nylon 610), and polyhexamethylene dodecanediamide (nylon 612), as well as such copolymers, and blends and the like designated as nylon 66/6; nylon 66/610; nylon 66/612; nylon 66/610/6; nylon 66/612/6 and the like. The polyamide composition may additionally contain various other conventional additives, stabilizers, coloring agents, anti-oxidants, pigments and the like. Flame retardance may be effectively imparted to such nylon polymers, as well as to styrene-acrylonitrile (SAN) resins and acrylonitrile-butadiene-styrene (ABS) resins, by the incorporation therein of an effective flame retardant amount of the above described metal salts of 2,5-dimercapto-1,3,4-thiadiazole. The resulting polymeric compositions are characterized by excellent thermal stability at usual processing temperatures, increased char formation during combustion, a minimization of the release of toxic gases during combustion, and minimal corrosion problems during normal polymer processing.

The flame retardant additives can be incorporated into the polymer composition by various methods. The ingredients can be blended in the dry form and then extruded, molded or otherwise shaped in a known manner. Alternatively the flame retardant additives can be mixed with the polymer in the molten state, provided the temperature of the molten polymer is not so high as to decompose the additive salt. The flame retardant nylon polymers can be formed by various conventional methods and apparatus such as extrusion injecting molding, compression molding and the like, to various physical forms, such as shaped articles, moldings, sheets, rods, fibers, coatings, films, fabrics and the like.

The additive metal salts are incorporated into the polymer in an effective flame retardant amount. Most generally, excellent flame retardance is achieved when the metal salt of 2,5-dimercapto-1,3,4-thiadiazole is incorporated in the polymer in an amount of about 0.5 to about 50 percent by weight and most preferably about 1.0 to about 15 percent by weight of the total polymer composition.

Various other flame retardants, such as halogen-containing and/or phosphorus containing flame retardants may be employed in combination with the metal salts of 2,5-dimercapto-1,3,4-thiadiazole (DMTDA) in the flame retardant nylon polymer compositions of this invention. In one embodiment the flame retardant nylon compositions of this invention comprise, in addition to the metal salt of DMTA, elemental phosphorus, preferably encapsulated red phosphorus in an amount of about 0.5 to about 25 percent by weight of the total polymer composition. A particularly preferred composition comprises about 1.0 to about 10 percent of a metal salt of 2,5-dimercapto-1,3,4-thiadiazole and about 1.0 to about 10 percent by weight of encapsulated phosphorus, based on the weight of the total polymer composition.

The following specific examples are provided to further illustrate this invention and the manner in which it may be carried out. It will be understood however, that the specific details given in the examples have been chosen for purpose of illustration and are not to be construed as a limitation on the invention. In the examples, unless otherwise indicated, all parts and percentages are by weight and all temperatures are in degrees Celsius.

EXAMPLE 1

A dispersion of 15 parts of 2,5-dimercapto-1,3,4-thiadiazole (DMTDA) in 250 parts of water was prepared and 100 parts of 8 percent aqueous NaOH was added, with stirring. A clear light yellow solution formed. To the solution was added a solution of 13.63 parts of $ZnCl_2$ in 100 parts of water. The mixture was stirred at ambient temperatures for about one-half hour. A white precipitate of a zinc salt of 2,5-dimercapto-1,3,4-thiadiazole formed and was collected by filtration, washed with distilled water and vacuum dried for about 16 hours at about 80° C. The yield of zinc salt was about 93 percent, based on the 2,5-dimercapto-1,3,4-thiadiazole starting material.

EXAMPLE 2

The procedure of Example 1 was repeated except that in place of the NaOH solution there was substituted a solution of 11.2 parts of KOH in 100 parts of water.

EXAMPLE 3

A sample of flame retardant nylon was prepared as follows: Eighty (80) parts of particulate Nylon 66 was mixed with 20 parts of zinc salt of 2,5-dimercapto-1,3,4-thiadiazole, prepared as in Example 1, and heated with mixing, to 275° C. The mixture was pressed in a thin sheet, cooled to room temperature, and crushed to particulate form. The particles were then compression molded at 275° C. and about 500 psi. to form a rod ¼ inch×4 inches.

Additional samples utilizing other metal salts of 2,5-dimercapto-1,3,4-thiadiazole and various polymers were similarly prepared and tested as described herein below.

EXAMPLES 4–10

A series of flame retardant nylon 66 samples was prepared as described in Examples 1–3 and tested for oxygen index following the procedure of ASTM D-2863. The results are tabulated in Table I, below. Virgin nylon 66 was employed as a control (Example 10C).

TABLE I

| Example No. | % of Nylon 6/6 | % of Zn—DMTDA | Oxygen Index |
|---|---|---|---|
| 4 | 95 | 5 | 24.2 |
| 5 | 90 | 10 | 24.1 |
| 6 | 85 | 15 | 24.9 |
| 7 | 80 | 20 | 29.9 |
| 8 | 70 | 30 | 26.9 |
| 9 | 60 | 40 | 29.1 |
| 10C | 100 | — | 23.0 |

A series of metal salts of 2,5-dimercapto-1,3,4-thiadiazole were prepared following the general procedure of Examples 1 and 2 except that in place of $ZnCl_2$ there was substituted an appropriate equivalent amount of a metal halide of Ba, Co, Ni, Mn, Cu, Cr, and Fe to prepare the corresponding metal salt of 2,5-dimercapto-1,3,4-thiadiazole. The metal salts were incorporated in nylon polymer samples following the procedure of Example 3 in a weight ratio of 80 parts nylon and 20 parts metal salt and the samples were tested for oxygen index following the procedure of ASTM D-2863 with the results as shown in Table II, below.

TABLE II

| Example No. | Polymer | Metal Salt of DMTDA | Oxygen Index |
|---|---|---|---|
| 11 | Nylon 66 | Ba | 31.6 |
| 12 | " | Co | 26.9 |
| 13 | " | Ni | 28.2 |
| 14 | " | Mn | 38.6 |
| 15 | " | Cu | 26.2 |
| 16C | " | — | 23.0 |
| 17 | Nylon 6 | Cr | 26.1 |
| 18 | " | Fe | 24.3 |
| 19 | " | Zn | 24.2 |
| 20 | " | Mn | 25.5 |
| 21C | " | — | 21.5 |

EXAMPLES 22–29

A series of samples of flame retardant nylon polymers was prepared following the general procedure of Examples 1–3, employing metal salts of DMTDA in admixture with encapsulated red phosphorus. The samples were tested for oxygen index (ASTM D-2863) with the results as shown in Table III, below.

TABLE III

| Example No. | Polymer | (%) | Metal Salt Of DMTDA | (%) | Red Phosphorous[1] (%) | Oxygen Index | Other Additive | % |
|---|---|---|---|---|---|---|---|---|
| 22 | Nylon 66 | 85 | Mn—DMTDA | 7.5 | 7.5 | 32.2 | — | — |
| 23 | " | 90 | " | 5.0 | 5.0 | 31.2 | — | — |
| 24 | " | 80 | Zn—DMTDA | 15.0 | 5.0 | 28.5 | — | — |
| 25 | " | 80 | " | 10.0 | 10.0 | 31.5 | — | — |
| 26 | Nylon 6 | 85 | Fe—DMTDA | 7.5 | 7.5 | 25.0 | — | — |
| 27 | " | 85 | Cr—DMTDA | 7.5 | 7.5 | 26.5 | — | — |
| 28 | " | 90 | Zn—DMTDA | 5.0 | 5.0 | 25.7 | — | — |
| 29 | " | 90 | Mn—DMTDA | 5.0 | 5.0 | 28.7 | — | — |
| 30 | Nylon 66 | 88 | Zn—DMTDA | 6.0 | 6.0 | 30.5 | — | — |
| 31 | " | 80 | Zn—DMTDA | 5.0 | 5.0 | 30.9 | Fiberglass[2] | 10.0 |
| 32 | " | 85 | Zn—DMTDA | 7.5 | — | 29.2 | Ammonium Polyphosphate | 7.5 |
| 33 | " | 80 | Zn—DMTDA | 10.0 | — | 27.9 | CaCO$_3$ | 10.0 |

[1]RP-12; Rin KagaKu Co., Japan; and encapsulated Red Phosphorus, containing at least 85% elemental phosphorus.
[2]10% by weight fiber glass reinforcing agent incorporated in polymer composition.

EXAMPLES 34–39

A series of samples flame retardant nylon polymers was prepared following the general procedure of Examples 1–3, except that various additional flame retardant additives and fillers were employed in admixture with a metal salt of DMTDA. The samples were tested for oxygen index (ASTM-D-2863) with the results as shown in Table IV, below.

TABLE IV

| Ex. | Polymer | (%) | Zn—DMTDA (%) | Bis(tetrabromophthalimido) ethylene | MgO | Oxygen Index |
|---|---|---|---|---|---|---|
| 34 | Nylon 66 | 75.0 | 15.5 | 7.5 | 2.0 | 32.0 |
| 35 | Nylon 66 | 75.0 | 13.0 | 10.0 | 2.0 | 34.1 |
| 36 | Nylon 66 | 75.0 | 18.0 | 5.0 | 2.0 | 28.0 |
| 37 | Nylon 66/612 (4:1) | 80.0 | 15.0 | 5.0 | — | 27.5 |
| 38 | Nylon 66/612 (4:1) | 80.0 | 12.5 | 7.5 | — | 27.4 |
| 39 | Nylon 66/612 (4:1) | 80.0 | 10.0 | 10.0 | — | 26.6 |

What is claimed is:

1. A flame retardant nylon composition comprising a nylon polymer and about 0.5 to about 50 weight percent of a Zn, Mn, Ba, Ni, Co, Fe, Cu, Mo, or Cr metal salt of 2,5-dimercapto-1,3,4-thiadiazole and about 0.5 to about 25 weight percent of red phosphorus.

2. A flame retardant nylon composition according to claim 1 wherein said red phosphorus is encapsulated red phosphorus.

3. A flame retardant nylon composition according to claim 1 wherein said metal is zinc.

4. A flame retardant nylon composition according to claim 1 wherein said metal is manganese.

5. A flame retardant nylon composition according to claim 1 wherein said metal is barium.

6. A flame retardant nylon composition according to claim 1 wherein said metal is nickel.

7. A flame retardant nylon composition according to claim 1 wherein said metal is chromium.

8. A flame retardant nylon composition according to claim 1 wherein said metal is cobalt.

9. A flame retardant nylon composition according to claim 1 wherein said metal is copper.

10. A flame retardant nylon composition according to claim 1 wherein said metal is iron.

* * * * *